United States Patent Office 2,843,569
Patented July 15, 1958

2,843,569

ELASTOMERIC POLYURETHANE COMPOSITIONS CONTAINING SIDE CHAIN ALKYLOL GROUPS

Anthony F. Benning, Woodstown, N. J., and Edward K. Gladding, New Castle, Del., assignors to E. I. du Pont de Nemours and Company, a corporation of Delaware No Drawing. Application August 4, 1955
Serial No. 526,565

6 Claims. (Cl. 260—77.5)

This invention relates to novel polyurethane elastomers and in particular to thermally stable polyurethane elastomers.

Heretofore various valuable elastomeric condensation products have been prepared from and cured with various polyisocyanates. As typical of the many methods has been the preparation of an elastomer from a polyalkyleneether glycol, an organic diisocyanate and a chain extending agent. Other glycols, such as polyalkyleneether-thioether glycols, polyalkylene-aryleneether glycols and polyaliphatic hydrocarbon glycols have been used. All of these elastomers have exhibited outstanding properties such as abrasion resistance and low temperature properties; however, they have generally been found to be somewhat deficient in thermal stability at high temperatures. While the cause of this thermal instability is not entirely known, it is generally believed that certain groups in these elastomers, such as the urea groups, cause the thermal instability.

It is an object of the present invention to provide novel thermally stable polyurethane elastomers. A further object is to provide polyurethane elastomers free of urea groups which may be cured by polyisocyanate curing procedures. A still further object is to provide a process for the preparation of these novel polyurethane elastomers. Other objects will appear hereinafter.

These and other objects of the following invention are accomplished by the novel polymeric polyurethanes consisting essentially of substantially equimolar amounts of (1) radicals obtained by removing the terminal chlorine atoms from bis-chloroformates alternating with (2) radicals obtained by removing a hydrogen atom from each of the nitrogen atoms of a diamine, said diamine having at least one primary amine group; with at least 60% of the total weight of the polymer being the polymeric radicals obtained by removing the terminal chlorine atoms from bis-chloroformates having molecular weights of at least 875 and being selected from the class consisting of polyalkyleneether bis-chloroformate, polyalkyleneether-thioether bis-chloroformate, polyalkylene-aryleneether bis-chloroformate and polyurethane bis-chloroformate; said polymeric polyurethanes having attached to at least one of the radicals derived from the diamine a side chain bearing a CH₂OH group, said side chain occurring at least once for every 8000 molecular weight units of said polymeric polyurethane.

These polymeric polyurethanes may be conveniently prepared by the reaction of a bis-chloroformate of a polymeric glycol, such as a polyalkyleneether glycol, with a substantially equimolar proportion of a diamine which bears hydrogens on both nitrogens, said diamine having at least one primary amine group, there being a side chain bearing a primary hydroxyl group present on the diamine reactant. These side chains serve as potential curing sites for the polymeric polyurethane and thus the polymer may be conveniently cured by the application of a polyisocyanate curing procedure.

In carrying out the process for the preparation of the polyurethanes of the present invention, it is quite obvious that various modifications may be made. Thus, it is possible to prepare polymers within the scope of the present invention by other general methods, such as the reaction of a polymeric bis-chloroformate with a diamine having a side chain bearing a primary hydroxyl group, plus an additional diamine of low molecular weight, non-polymeric bis-chloroformate reactant. With any process which is used, the ratio of bis-chloroformate, either in the form of the bis-chloroformate of the polymeric glycol or the bis-chloroformate of the low molecular weight, non-polymeric glycol, to the ratio of diamine used should be substantially equimolar in order to obtain a polymer of sufficiently high molecular weight for satisfactory processing. It is necessary that at least 60% of the total weight of the polymer be the radicals derived from the polymeric bis-chloroformate reactant having a molecular weight of at least 875, since it has been determined that the elastomeric properties of the resulting polymer are derived largely from this reactant.

The bis-chloroformates of the polymeric glycols which are useful in the present invention are compounds having the formula Cl—COO—R—OOC—Cl, wherein R is a bivalent organic radical having a molecular weight of at least about 716. These compounds may be prepared by the reaction of a high molecular weight glycol (having the formula HO—R—OH) and phosgene. For purposes of the present invention, the bis-chloroformates of the polymeric glycols which are useful have molecular weights of at least 875; however, they may be as high as about 10,000. In general, molecular weights of about 875 to 5,000 are preferred.

Various high molecular weight glycols, such as polyalkyleneether glycols, polyalkyleneether-thioether glycols, polyalkylene-aryleneether glycols and polyaliphatic hydrocarbon glycols may be used to form the bis-chloroformates which are useful in the present invention. In general, the polyalkyleneether glycols are preferred. These compounds may be represented by the formula

wherein R is an alkylene radical and $n$ is an integer sufficiently large that the polyalkyleneether glycol has a molecular weight of at least 750. Not all of the alkylene radicals present need be the same. These compounds are ordinarily derived by the polymerization of cyclic ethers such as alkylene oxides or dioxolane or by the condensation of glycols. The preferred polyalkyleneether glycol is polytetramethyleneether glycol, also known as polybutyleneether glycol. Polyethyleneether glycol, polypropyleneether glycol, 1,2-polydimethylethyleneether glycol and polydecamethyleneether glycol are other typical representatives of this class.

Another class of polymeric glycols which may be used are the polyalkyleneether-thioether glycols which may be represented by the formula HO(QY)$_n$H, wherein Q represents hydrocarbon radicals at least some of which are alkylene, Y represents chalcogen atoms, some of which are sulfur and the rest oxygen, and $n$ is an integer sufficiently large so that the glycol has a molecular weight of at least 750. These glycols may be conveniently prepared by condensing together various glycols and thiodiglycol in the presence of a catalyst such as p-toluene sulfonic acid.

Another useful class of glycols are the polyalkylene-aryleneether glycols. These glycols are similar to the polyalkyleneether glycols except that some arylene radicals are present. In general, the phenylene and naphthylene radicals are preferred with or without substituents such as alkyl or alkylene groups.

The bis-chloroformates of polyaliphatic hydrocarbon glycols may also be used. The aliphatic portion of these glycols may be either saturated or unsaturated; however, in general, the unsaturated compounds are preferred. They may be conveniently prepared by polymerizing the appropriate polymerizable unsaturated monomer.

Valuable polymers within the scope of the present invention may also be prepared by using a bis-chloroformate of a polyurethane glycol. In this instance, a polyurethane is prepared by reacting a molar excess of a polymeric glycol, such as a polyalkyleneether glycol, with an organic diisocyanate. The resulting polymer is a polyurethane containing terminal hydroxyl groups and this then may be reacted with phosgene to form the bis-chloroformate. In preparing this polyurethane glycol, any of a wide variety of organic diisocyanates may be employed in the reaction, including aromatic, aliphatic and cycloaliphatic diisocyanates and combinations of these types. Representative compounds include toluene-2,4-diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6 - hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. The polyurethane bis-chloroformates are more particularly described and claimed in U. S. Patent 2,757,191.

In general, any diamine having at least one primary amine group may be used to prepare the polymeric polyurethanes of the present invention. These diamines may be aliphatic, aromatic or cycloaliphatic type compounds. However, in general, the simple type diamines are preferred. Representative diamines are: aminoethylethanolamine, 1,5-diaminonaphthalene, m-tolylene diamine, hexamethylene diamine, 1,4-cyclohexyl diamine, ethylene diamine and N-($\beta$-hydroxyethyl)-p-phenylene diamine.

When the process of the present invention is carried out by using other bis-chloroformates in addition to the bis-chloroformates of the polymeric glycols with the diamines having at least one primary amine group, i. e., when a bis-chloroformate of a low molecular weight, non-polymeric glycol is used, the molecular weight of this glycol should not be above about 200. The bis-chloroformates of these low molecular weight glycols may be prepared in the same general manner as is used for the preparation of the bis-chloroformates of the polymeric glycols. Representative glycols are: ethylene glycol, 1,3-propylene glycol, 1,4-butanediol, 1,5-pentanediol and p-phenylene dicarbinol.

It is quite obvious that when the bis-chloroformates of the low molecular weight glycols are used, it will not be necessary to have as much of the bis-chloroformate of the polymeric glycol present, but still not less than 60% of the total weight of the polymer, since there should be a substantially equimolar amount of diamine and bis-chloroformate used. It is to be understood that the viscosity of the resulting polymeric polyurethane may be varied with changes in proportions of reactants.

The side chains bearing the primary hydroxyl groups serve as curing sites for the polymeric polyurethane and it is necessary that there be at least one of these side chains occurring for every 8000 molecular weight units in order that the polymer may be adequately cured. It is to be understood that it is not necessary that the primary hydroxyl group be attached directly to the polymer but that the primary hydroxyl group may be present in a side chain attached to the polymer. There may be more than one of these side chains present for every 8000 molecular weight units and the number of cross linking sites present may be in excess of the number utilized in the curing step. On the average, it is preferred to have not more than about one cross linking site per 500 molecular weight units of product.

The polymeric polyurethanes of the present invention may conveniently be cured by application of a conventional polyisocyanate curing procedure. In this case, it is necessary to add an organic polyisocyanate which will react with the primary hydroxyl group on the side chains to form urethane linkages. In general, an organic diisocyanate is preferred and this may be of the aromatic, aliphatic or cycloaliphatic type. Representative compounds include toluene-2,4-diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocynate. In general, the higher boiling aromatic curing agents, such as 4,4'-methylene di-o-tolyl isocyanate, are usually preferred.

In practice, the addition of from 1 to 20% of a diisocyanate, based on the weight of the uncured reaction product, is adequate for the curing of the products. In general, it is preferred to add no more polyisocyanate than is equivalent to the primary hydroxyls in the polymer. The diisocyanate may be conveniently mixed with the uncured product on a rubber mill and the mixture may then be cured by placing it in a mold and heating under pressure. Only enough pressure is required to force the elastomer to assume the shape of the mold. The temperatures and pressures used in ordinary rubber processing are satisfactory for use in curing the elastomers of this invention. Pressures of 50 to 1000 pounds per square inch or higher and temperatures of from 80 to 175° C. are ordinarily satisfactory. Most of the polymers of this invention may conveniently be cured or vulcanized by heating at 130 to 135° C. for about 2 hours. The diisocyanate compounding procedure should be carried out under substantially anhydrous conditions.

The following examples will better illustrate the nature of the present invention; however, the invention is not intended to be limited to these examples. Parts are by weight unless otherwise indicated.

The apparatus used in the high temperature rebound test is constructed as follows: A copper melting point block 4 inches in diameter at the face which is 0.75 inch thick and having a conical bottom measuring 1.75 inches from the bottom of the face to the apex of the cone and having a hole drilled horizontally into the face to carry a thermometer is clamped so that the face is level. A Bunsen burner directly under the apex of the cone is the source of heat. A glass cylinder approximately 1 inch in diameter and having graduations marked on it is clamped vertically just above the block. Immediately below the cylinder, a sheet of aluminum foil about 1.5 x 1.5 inches square is placed on the copper block. The upper surface of the foil is waxed lightly with a fluorocarbon grease. A specimen of the elastomer in the form of a sheet about 1.25 x 1.25 inches square and about 0.05 to 0.09 inch thick is placed on the aluminum foil. The glass cylinder is then lowered so that it rests firmly on the specimen and is in complete contact with it all around the edge of the cylinder. Steel ball bearings, 0.125 inch in diameter and weighing 0.25 g. each are used for the rebound.

In operation, the copper block is heated so that the temperature rises approximately 25° per minute. A steel ball bearing is dropped into the cylinder from the top and the height to which it bounces on the first bounce is noted. The ball is retrieved from the bottom of the cylinder with a magnet. This operation is continued, 2 to 3 readings being taken at incremental temperatures. The results are recorded in terms of percent of the height of rebound to the total height of fall. The maximum height of rebound is observed as the sample is heated and the temperature at which the rebound decreases 10% from the maximum (T–10) and 40% (T–40) is recorded. These figures are interpolated from a plot of the percent rebound versus temperature.

The smear point value is the temperature at which a trail of molten polymer is left on the copper block when a sample is drawn slowly over the surface while pushing it against the block firmly by hand. A screw driver makes a suitable instrument for holding the sample against the block.

The stress-strain properties of the elastomers are determined by the conventional methods used in the rubber industry.

*Example 1*

(A) 955 parts of polytetramethyleneether glycol, having a molecular weight of 955 and 140 parts of toluene-2,4-diisocyanate are heated together under nitrogen at 90–100° C. for 1 hour, at 100–120° C. for 1 hour and finally at 120–130° C. for 1 hour to form a polyurethane glycol. After cooling, 540 parts of the polyurethane glycol is dissolved in 616 parts of dry benzene which is then added gradually while stirring over a period of about 2 hours to 540 parts of liquid phosgene, the temperature being maintained at 0–10° C. by cooling. After the addition is complete, the mass is allowed to warm up to room temperature. After about 2 hours, a stream of nitrogen is blown through the solution while it is agitated vigorously and the temperature is maintained at 30–35° C. to remove excess phosgene. From time to time dry benzene is added to replace that carried off with the nitrogen. After 24 hours, the exit gas is free of phosgene. 1117 parts of benzene solution of the polyurethane bis-chloroformate is recovered.

1110 parts of the solution containing 530 parts or .0972 mol of the polyurethane bis-chloroformate is added to 20.2 parts aminoethylethanolamine

($H_2NC_2H_4NHC_2H_4OH$)

dissolved in 710 parts of tetrahydrofuran while stirring at 25–30° C. under nitrogen. About 1 hour is required for the addition. As the reaction mass becomes more viscous, additional tetrahydrofuran is added to facilitate the agitation. A total of 880 parts of tetrahydrofuran is added. The mass is then stirred 16 hours to insure completeness of reaction. There is then added 27 parts of potassium carbonate dissolved in 250 parts of water to destroy all the amine hydrochloride salts.

The solution is then poured into about 3000 parts of water while stirring and a ropy polymer precipitates. The polymer is collected and put on a rubber wash mill and washed with water for 30 minutes. It is then removed to a rubber mill with smooth rolls and dried at 120–130° C. This polymer has an average molecular weight of 5575 per side chain curing site.

100 parts of this dry polymer is then compounded on a rubber roll mill with 30 parts of conductive channel black and 4 parts of 3,3'-dimethyl-4,4'-biphenyl diisocyanate. The compounded stock is placed in molds and cured in a press for 2 hours at 134° C.

(B) Another elastomer is made in the same way starting with 1071 parts of the polytetramethyleneether glycol and 117 parts of toluene-2,4-diisocyanate. 508 parts of the polyurethane bis-chloroformate requires 32.3 parts of aminoethylethanolamine.

The following table summarizes the properties of the two elastomers:

|  | A | B |
| --- | --- | --- |
| Molar ratio of polyether glycol/diisocyanate | 5:4 | 3:2 |
| Intrinsic viscosity of polymer before compounding | 2.3 | 1.76 |
| Tensile strength at break, 25° C., lbs./sq. in. | 5,000 | 4,600 |
| Modulus at 300% elongation, 25° C., lbs./sq. in. | 1,100 | 1,850 |
| Elongation at break, 25° C., percent | 510 | 450 |
| Yerzley resilience, 25° C | 65 |  |
| Maximum rebound, percent | 63 | 68 |
| T-10 Rebound, ° C | 225 | 230 |
| T-40 Rebound, ° C | 245 | 265 |
| Smear Point, ° C | 285 | 300 |

*Example 2*

900 parts of polytetramethyleneether glycol, having a molecular weight of 3010, is added slowly to 600 parts of phosgene while stirring at 10–15° C. After it is all added, the mixture is refluxed at 15–20° C. for 3 hours. Then the excess phosgene is removed by blowing with nitrogen, finally holding the temperature at 45–50° C. for 3 hours.

157 parts of the polytetramethyleneether bis-chloroformate so formed is dissolved in 300 parts of tetrahydrofuran. While stirring this solution at 25–30° C., there is first added over a 10 minute period 3.95 parts of 1,5-diaminonaphthalene dissolved in 88 parts of tetrahydrofuran and then 7.8 parts of aminoethylethanolamine dissolved in 88 parts of tetrahydrofuran over a 10 minute period.

The mixture is then permitted to stand at room temperature 16 hours. A solution of 5 parts of sodium carbonate in 100 parts of water is added with stirring and the mass is poured into about 1000 parts of water. The polymer is collected, washed with water on a rubber wash mill and then dried at 120° C. on a rubber roll mill. The intrinsic viscosity is 1.13. This polymer has an average molecular weight of 3155 per side chain curing site.

100 parts of the polymer is compounded on a rubber roll mill with 30 parts of easy processing channel black and 3 parts of 3,3'-dimethyl-4,4'-biphenyl diisocyanate. The compounded stock is put in molds and cured in a press for 2 hours at 134° C. The tensile strength at break at 25° C. is 5000 lbs./sq. in., the modulus at 300% elongation at 25° C. is 2000 lbs./sq. in. and the elongation at break at 25° C. is 420%. The T-10 rebound value is 220° C.

The elastomers prepared according to this invention have many varied uses. They may be employed in the preparation of tires, inner tubes, belts, hose and tubing, wire and cable jackets, footwear, sponges, coated fabrics, and a wide variety of coated or molded articles. They are characterized by excellent thermal stability properties and by a number of other advantageous properties, including excellent resistance to direct sunlight, oxygen and ozone, oil and other hydrocarbon solvents. They display unusually outstanding resistance to mechanical abrasion and to deterioration caused by flexing, stretching and the like.

The elastomeric properties of these materials may be varied by suitable compounding. The amount and type of compounding agent to be incorporated in the stock is dependent upon the use for which the elastomer is intended. The compounding agents ordinarily used in the rubber industry with either natural or synthetic rubber are useful with the products of this invention. These include carbon black, clay, silica, esterified silica particles, talc, zinc, and magnesium oxides, calcium and magnesium carbonate, titanium dioxide, and plasticizers. Inorganic and organic coloring agents may be incorporated to give well defined colors, as the natural color of these elastomers is a pale yellow or light amber.

As many widely different embodiments of this invention may be made without departing from the spirit and scope thereof, it is to be understood that this invention is not limited to the specific embodiments thereof except as defined in the appended claims.

What is claimed is:

1. Polymeric polyurethanes consisting essentially of substantially equimolar amounts of (1) radicals obtained by removing the terminal chlorine atoms from bis-chloroformates alternating with (2) radicals obtained by removing a hydrogen atom from each of the nitrogen atoms of a diamine, said diamine having at least one primary amine group; with at least 60% of the total weight of the polymer being the polymeric radicals obtained by removing the terminal chlorine atoms from bis-chloroformates having molecular weights of at least 875 and being selected from the class consisting of polyalkyleneether bis-chloroformate, polyalkyleneether-thioether bis-chloroformate, polyalkylenearyleneether bis-chloroformate and polyurethane bis-chloroformate; said polymeric polyurethanes having attached to at least one of the radicals obtained from the diamine a side chain bearing a $CH_2OH$ group, said side chain occurring at least once for every 8000 molecular weight units of said polymeric polyurethane.

2. Polymeric polyurethanes consisting essentially of substantially equimolar amounts of radicals obtained by removing the terminal chlorine atoms from polyalkyleneether bis-chloroformates having molecular weights of at least 875 alternating with radicals obtained by removing a hydrogen atom from each of the nitrogen atoms of aminoethylethanolamine; with at least 60% of the total weight of the polymer being the polyalkyleneether bis-chloroformate radicals and there being a side chain hydroxyethyl group occurring at least once for every 8000 molecular weight units of polymeric polyurethane.

3. Polyurethanes of claim 2 wherein the polyalkyleneether bis-chloroformates are polytetramethyleneether bis-chloroformates.

4. Polymeric polyurethanes consisting essentially of substantially equimolar amounts of radicals obtained by removing the terminal chlorine atoms from polyurethane bis-chloroformates having molecular weights of at least 875 alternating with radicals obtained by removing a hydrogen atom from each of the nitrogen atoms of aminoethylethanolamine; with at least 60% of the total weight of the polymer being the polyurethane bis-chloroformate radicals and there being a side chain hydroxyethyl group occurring at least once for every 8000 molecular weight units of polymeric polyurethane.

5. Polyurethanes of claim 4 wherein the polyurethane bis-chloroformates are obtained by the reaction of phosgene with the reaction product of an organic diisocyanate and a molar excess of a polyalkyleneether glycol.

6. A cured elastomer obtained by reacting the polymeric polyurethanes of claim 1 with an organic polyisocyanate.

References Cited in the file of this patent

UNITED STATES PATENTS 2,692,874    Langerak _____ Oct. 26, 1954

FOREIGN PATENTS 956,556    France _____ Feb. 2, 1950

UNITED STATES PATENT OFFICE

CERTIFICATE OF CORRECTION

Patent No. 2,843,569                                            July 15, 1958

Anthony F. Benning et al.

It is hereby certified that error appears in the printed specification of the above numbered patent requiring correction and that the said Letters Patent should read as corrected below.

Column 1, line 58, for "$CH_2OH$" read -- $-CH_2OH$ --; column 6, line 13, for "diamonaphthalene" read -- diaminonaphthalene --; column 7, line 7, for "$CH_2OH$" read -- $-CH_2OH$ --.

Signed and sealed this 7th day of October 1958.

(SEAL)
Attest:

KARL H. AXLINE
Attesting Officer

ROBERT C. WATSON
Commissioner of Patents